United States Patent [19]

Ishibashi et al.

[11] 4,193,807

[45] Mar. 18, 1980

[54] OPTICAL GLASS

[75] Inventors: Kazufumi Ishibashi, Sagamihara; Takeo Ichimura, Tokyo, both of Japan

[73] Assignee: Nippon Kogaku K.K., Tokyo, Japan

[21] Appl. No.: 956,067

[22] Filed: Oct. 30, 1978

[30] Foreign Application Priority Data

Oct. 31, 1977 [JP] Japan .................. 52-129671

[51] Int. Cl.$^2$ .................................................. C03C 3/16
[52] U.S. Cl. ................................................. 106/47 Q
[58] Field of Search ....................................... 106/47 Q

[56] References Cited

U.S. PATENT DOCUMENTS 4,115,131  9/1978  Ishibashi et al. ............. 106/47 Q Primary Examiner—Helen M. McCarthy
Attorney, Agent, or Firm—Fitzpatrick, Cella, Harper & Scinto

[57] ABSTRACT

Optical glass contains 11 to 32% by weight of $P_2O_5$, 34 to 60% by weight of PbO and 22 to 50% by weight of $Nb_2O_5$.

7 Claims, 1 Drawing Figure

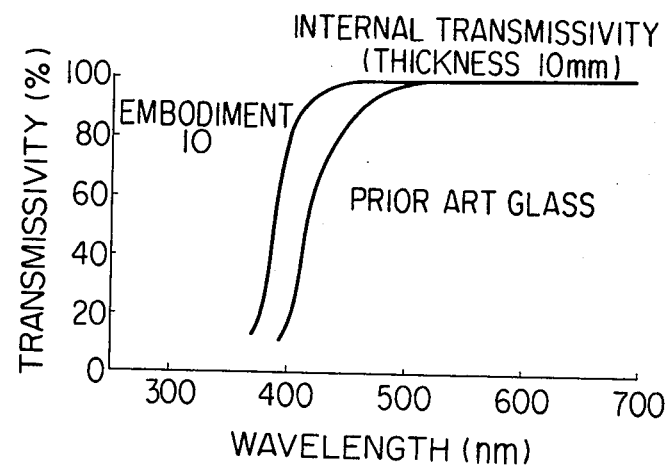

4,193,807

OPTICAL GLASS

BACKGROUND OF THE INVENTION

1. Field of the Invention

This invention relates to optical glass of high refractive index and high dispersion capability.

2. Description of the Prior Art

Heretofore, optical glasses of high refractive index and high dispersion have included those which are within the range of the so-called biflint glass or lanthanum biflint glass and which contain as a main component glass mesh forming oxide such as silicic acid ($SiO_2$) or boracic acid ($B_2O_3$), glass mesh modifying oxide such as alkali metal oxide, alkaline earth metal oxide, zinc oxide (ZnO), lead oxide (PbO), titanium oxide ($TiO_2$), lanthanum oxide ($La_2O_3$), zirconium oxide ($ZrO_2$), tantalum oxide ($Ta_2O_5$) or niobium oxide ($Nb_2O_5$), or intermediate oxide such as aluminum oxide ($Al_2O_3$). These optical glasses have been widely used as the material of the elements forming optical instruments, but they are not always satisfactory in transmissivity to light and chemical durability. Such tendency is particularly strong in those materials which have high refractive index and which contain less silicic acid and more lead oxide. Recently, along with the wide spread use of color photography, the requirement for the transmissivity to light of optical glass has become exacting, and the yellowish color peculiar to the optical glasses which are within the above range has been regarded as a greater disadvantage than before. Also, the advantage of the optical glass polishing technique has often exposed the optical glasses to severe polishing conditions and along with the spread of a multilayer coating, the presence of corrosive degenerating layers in the surface of the glass has become impermissible, and accordingly, chemical durability of the glass has become a more important factor than heretofore.

SUMMARY OF THE INVENTION

We have conceived and contribute by the present invention an optical glass of high refractive index and high dispersion capability and which is excellent both in transmissivity and chemical durability.

The optical glass according to the present invention contains phosphoric acid $P_2O_5$, lead oxide PbO and niobium oxide $Nb_2O_5$ in the range of 11–32, 34–60 and 22–50, respectively, all being percentages by weight. As regards its optical constant, the refractive index (nd) and Abbe number ($\nu$d) range from 1.75 to 2.13 and 17 to 28, respectively.

$P_2O_5$ is a material widely used as a glass mesh forming oxide, and PbO and $Nb_2O_5$ are useful components as glass mesh modifying oxide which imparts the property of high refractive index to the glass. The optical glass of the present invention contains only these three components or contains them as principal components.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein:

The single FIGURE of the drawing shows transmissivities to light of the optical glass according to the present invention and the optical glass of the prior art.

DESCRIPTION OF THE PREFERRED EMBODIMENTS $P_2O_5$ as a glass mesh modifying oxide generally has a capability of melting and forming phosphate glass at lower temperatures than $SiO_2$ or $B_2O_3$ in silicate or borate glass and also is characterized in that its transmissivity to light is higher for the near ultraviolet range than for the visible range. $Nb_2O_5$ is an oxide which imparts the properties of high refractive index and relatively high dispersion to glass and which enhances the chemical durability of the glass. However, the conventional glasses have a narrower range in which the glass can contain $Nb_2O_5$ and accordingly, the use of $Nb_2O_5$ has been very much limited. PbO has properties of imparting high refractive index and high dispersion to glass and also of lowering the liquid phase temperature of the glass to stabilize it against devitrification. Therefore, as in the present invention, by introducing PbO into the $P_2O_5$-$Nb_2O_5$ system, an optical glass having a great $Nb_2O_5$ content has been accomplished and it has become possible widely to expand the glass range in which the glass is stable against devitrification. Moreover, an optical glass having the feature of phosphate glass having a high transmissivity to light, the feature of glass containing niobium oxide having a high refractive index and a high chemical durability, and the feature of glass containing lead oxide having a high refractive index and high dispersion has become manufacturable over a wide optical constant range. Thus, even by only the basic three-component system of $P_2O_5$-PbO-$Nb_2O_5$, it is possible to obtain an optical glass which is stable against devitrification over a wide optical constant range, but it will be necessary to add one or more other components in order to further widen the optical constant range of the optical glass. Addition of a suitable amount of one or more other components will result not only in suitable obtainment of a desired optical constant, but also further lowering of the liquid phase temperature and accordingly further stability of the glass against devitrification, as well as lowering of the melting point which will lead to greater ease of melting. Accordingly, the contamination or coloring of the glass due to the corrosion of the crucible is more often reduced.

As such an additive, there are alkali metal oxides. Addition of one or more of lithium oxide $Li_2O$, sodium oxide $Na_2O$ and potassium oxide $K_2O$ results in lowered liquid phase temperature and greater stability of the glass against devitrification which in turn leads to the possibility of mass production of the glass. As the result of the lowered liquid phase temperature, the melting point is lowered and the coloring of the glass due to corrosion of the crucible during the melting can be reduced. However, if a suitable amount is exceeded, the devitrification property will be increased. Among the aforementioned alkali metal oxides, the effect of the addition of $K_2O$ is most pronounced. The amount of one or more of the alkali metal oxides to be added as required is in the range of 1 to 18% by weight.

By further introducing $TiO_2$ into the $P_2O_5$-PbO-$Nb_2O_5$-$R_2O$ system ($R_2O$ is in combination with one or more of $Li_2O$, $Na_2O$ and $K_2O$), an optical glass having a higher refractive index and a lower Abbe number may be obtained more stable against devitrification. $TiO_2$, as well as $Nb_2O_5$, imparts a high refractive index to the glass. Accordingly, the introduction of $TiO_2$ into part of $Nb_2O_5$ can produce a glass of high refractive index even if the amount of $Nb_2O_5$ is decreased, and the decreased amount of $Nb_2O_5$ results in lowered liquid phase temperature and greater stability against devitrification. Glass containing $TiO_2$ is highly excellent in chemical durability. The amount of $TiO_2$ to be added as required is in the range of 1 to 12% by weight. Also, by introducing as the other additive a suitable amount of magnesium oxide MgO, calcium oxide CaO, strontium oxide SrO, barium oxide BaO, zinc oxide ZnO, tungsten oxide $WO_3$, germanium oxide $GeO_2$, aluminum oxide $Al_2O_3$, flourine F or boracic acid $B_2O_3$, an optical glass can be provided which has a good chemical durability and good transmissivity to light over a wide range of refractive index. Particularly, boracic acid $B_2O_3$, is stable against devitrification of the glass. Addition of yttrium oxide $Y_2O_3$, zirconium oxide $ZrO_2$, tantalum oxide $Ta_2O_5$, rare earth element oxide and silicic acid $SiO_2$ is not preferable because these increase the liquid phase temperature, but if in small amount, they may be added to enhance the optical properties and chemical durability of the glass.

The upper and lower limits of the range of content of each component have been determined by the reasons set forth below. $P_2O_5$, if less than 11% by weight (hereinafter, "by weight" will be omitted), renders the glass unstable against divitrification and if more than 32%, reduces the refractive index. PbO, if less than 34%, reduces the refractive index and if more than 60%, renders the glass unstable against devitrification. $Nb_2O_5$, if less than 22%, reduces the refractive index and if more than 50%, renders the glass unstable against divitrification. $R_2O$ to be added as required, if less than 1%, has no effect and if more than 18%, renders the glass unstable against devitrification.

$TiO_2$ to be added as required, if less than 1% has no effect and if more than 12%, renders the glass unstable against devitrification and intensely colors the glass.

Of these ranges of composition, the glass having the following ranges of composition by weight percent has a refractive index (nd) ranging from 1.88 to 2.13 and such high refractive index is suited for the production of high performance lenses.

| Components | Weight Percent |
|---|---|
| $P_2O_5$ | 11–22 |
| PbO | 35–60 |
| $Nb_2O_5$ | 24–50 |
| $R_2O$ | 1–9 |

Of these ranges of composition, the glass having the following ranges of composition by weight percent is more excellent in transmissivity to light.

| Components | Weight Percent |
|---|---|
| $P_2O_5$ | 11–22 |
| PbO | 35–50 |
| $Nb_2O_5$ | 24–35 |
| $R_2O$ | 3–9 |

Of these ranges of composition, the glass having the following ranges of composition by weight percent is more excellent in stability against devitrification.

| Components | Weight Percent |
|---|---|
| $P_2O_5$ | 18–22 |
| PbO | 40–50 |
| $Nb_2O_5$ | 24–30 |
| $R_2O$ | 3–7 |

Of these ranges of composition, the glass having the following composition by weight percent is more excellent in transmissivity to light.

| Components | Weight Percent |
|---|---|
| $P_2O_5$ | 20.05 |
| PbO | 48.52 |
| $Nb_2O_5$ | 24.96 |
| $R_2O$ | 6.47 |

The optical glass of the present invention can be produced by using, as the material of component, $P_2O_5$ from aqueous solution of orthophosphoric acid $H_3PO_4$ or phosphate of the other component, for example, potassium metaphosphate and using, as the other component, corresponding oxides, carbonate, nitrate, flouride, etc. and if required, adding a desired amount of defoaming agent such as arsenious acid $As_2O_3$ or the like, mixing them at a desired ratio to prepare a composition, placing the composition into a platinum crucible in an electric furnace heated to 950–1200° C., stirring the material after having melted and homogenizing the same, and then casting it into an iron mold and gradually cooling the same. Flourine is introduced as a flouride having positive ions as a component.

The composition (% by weight), the refractive indices (nd) and Abbe numbers (νd) of embodiments of the optical glass according to the present invention are shown in Table 1.

TABLE 1

|  | 1 | 2 | 3 | 4 | 5 | 6 |
|---|---|---|---|---|---|---|
| $P_2O_5$ | 20.54 | 16.79 | 16.45 | 12.92 | 20.12 | 16.14 |
| PbO | 53.82 | 58.06 | 46.57 | 50.79 | 42.19 | 35.52 |
| $Nb_2O_5$ | 25.64 | 25.15 | 36.98 | 36.29 | 37.69 | 48.34 |
| nd | 1.9753 | 2.0311 | 2.0468 | 2.1220 | 2.0181 | 2.0858 |
| νd | 21.9 | 20.7 | 19.5 | 18.3 | 19.7 | 17.9 |

|  | 7 | 8 | 9 | 10 | 11 | 12 | 13 | 14 | 15 |
|---|---|---|---|---|---|---|---|---|---|
| $P_2O_5$ | 20.28 | 20.37 | 20.01 | 20.05 | 20.39 | 25.04 | 20.63 | 22.63 | 30.04 |

TABLE 1-continued

| | | | | | | | | | |
|---|---|---|---|---|---|---|---|---|---|
| PbO | 40.82 | 43.38 | 47.24 | 48.52 | 49.31 | 34.25 | 49.01 | 49.01 | 34.25 |
| $Nb_2O_5$ | 30.86 | 28.18 | 26.29 | 24.96 | 25.38 | 23.91 | 24.51 | 24.51 | 23.91 |
| $Li_2O$ | — | — | — | — | 0.63 | — | — | 3.85 | — |
| $Na_2O$ | — | — | — | — | 0.66 | — | 5.85 | — | — |
| $K_2O$ | 8.04 | 8.07 | 6.46 | 6.47 | 3.63 | 16.80 | — | — | 11.80 |
| nd | 1.8909 | 1.8839 | 1.9025 | 1.8983 | 1.9030 | 1.7568 | 1.9041 | 1.9105 | 1.7622 |
| νd | 22.6 | 23.0 | 22.8 | 23.0 | 22.5 | 27.3 | 23.2 | 23.8 | 27.7 |

| | 16 |
|---|---|
| $P_2O_5$ | 20.19 |
| PbO | 37.66 |
| $Nb_2O_5$ | 25.14 |
| $K_2O$ | 7.01 |
| $TiO_2$ | 10.00 |
| nd | 1.9501 |
| νd | 19.7 |

The drawing shows the spectral transmissivity curves of the glass of embodiment 10 and the glass of the prior art having the same refractive index (nd) and the same Abbe number (νd) as those of the glass of the embodiment 10. This spectral transmissivity is that of 10 mm interior of the glass. It is apparent from the drawing that the optical glass of the present invention is superior to that of the prior art in transmissivity to light, particularly transmissivity to short wavelength side lights.

Table 2 shows the acid resistivity which is a standard of chemical durability of the glass of embodiment 10 and the glass of the prior art having the same refractive index (nd) and the same Abbe number (νd) as those of embodiment 10. The acid resistivity has been calculated by keeping glass powder of specific gravity gram having a size of 420 to 590 μm in 0.01 N nitric acid at 100° C. for 60 minutes, and calculating the percentage of reduction in quantity (% by weight) from the weight of the sample and the amount of reduction; and the smaller the amount of reduction, the more excellent is the chemical durability of the glass. It is apparent from Table 2 that the optical glass of the present invention is superior to that of the prior art.

TABLE 2

| CHEMICAL DURABILITY | |
|---|---|
| | Acid Resistivity |
| Embodiment 10 | 0.15 |
| Prior Art Glass | 0.98 |

According to the present invention, as has hitherto been described, optical glass having a high refractive index and high dispersion, namely, a refractive index (nd) ranging from 1.75 to 2.13 and Abbe number (νd) ranging from 17 to 28 and which is excellent both in transmissivity to light and chemical durability can be produced stably on an industrial scale.

We believe that the novel optical glass and its formation will now be understood, and that the advantages thereof will be fully appreciated by those persons skilled in the art.

We claim:

1. Optical glass having a refractive index (ηd) range from 1.75 to 2.13 and Abbe number (νd) range from 17 to 28, consisting essentially of the following in % by weight:

| Component | Weight Percent |
|---|---|
| $P_2O_5$ | 11–32 |
| PbO | 34–60 |
| $Nb_2O_5$ | 22–50 |

2. Optical glass according to claim 1, further containing the following in % by weight:

| Component | Weight Percent |
|---|---|
| $R_2O$ | 1–18 | where $R_2O$ is in combination with one or more of $Li_2O$ $Na_2O$ and $K_2O$.

3. Optical glass according to claim 2, further containing the following in % by weight:

| Component | Weight Percent |
|---|---|
| $TiO_2$ | 0–12 |

4. Optical glass according to claim 3, having a refractive index from 1.88 to 2.13, consisting essentially of the following in % by weight:

| Component | Weight Percent |
|---|---|
| $P_2O_5$ | 11–22 |
| PbO | 35–60 |
| $Nb_2O_5$ | 24–50 |
| $R_2O$ | 1–9 |
| $TiO_2$ | 0 |

5. Optical glass according to claim 4, containing the following in % by weight:

| Component | Weight Percent |
|---|---|
| PbO | 35–50 |
| $Nb_2O_5$ | 24–35 |
| $R_2O$ | 3–9 |

6. Optical glass according to claim 5, containing the following in % by weight:

| Component | Weight Percent |
|---|---|
| $P_2O_5$ | 18–22 |
| PbO | 40–50 |
| $Nb_2O_5$ | 24–30 |
| $R_2O$ | 3–7 |

7. Optical glass according to claim 6, containing the following in % by weight:

| Component | Weight Percent |
|---|---|
| $P_2O_5$ | 20.05 |
| PbO | 48.52 |
| $Nb_2O_5$ | 24.96 |
| $K_2O$ | 6.47 |

* * * * *